(12) United States Patent
Adimatyam et al.

(10) Patent No.: US 8,621,000 B2
(45) Date of Patent: Dec. 31, 2013

(54) REGION OF INTEREST STREAMING (75) Inventors: Venkata S. Adimatyam, Irving, TX (US); Sameer Vasant Gavade, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 161 days.

(21) Appl. No.: 13/069,875

(22) Filed: Mar. 23, 2011

(65) Prior Publication Data
US 2012/0246218 A1   Sep. 27, 2012

(51) Int. Cl.
*G06F 15/16* (2006.01)

(52) U.S. Cl.
USPC .......................................... 709/203; 709/231

(58) Field of Classification Search
None
See application file for complete search history.

(56) References Cited

U.S. PATENT DOCUMENTS

| | | | |
|---|---|---|---|
| 2009/0300204 A1* | 12/2009 | Zhang et al. | 709/231 |
| 2010/0063997 A1* | 3/2010 | Sako et al. | 709/203 |
| 2010/0250658 A1* | 9/2010 | Yano | 709/203 |
| 2011/0072355 A1* | 3/2011 | Carter et al. | 715/738 |
| 2012/0086815 A1* | 4/2012 | Cooper et al. | 348/207.1 |
| 2012/0158985 A1* | 6/2012 | Patten et al. | 709/231 |
| 2012/0166953 A1* | 6/2012 | Affronti et al. | 715/730 |

* cited by examiner

*Primary Examiner* — Hassan Phillips
*Assistant Examiner* — Omeed D Rahgozar

(57) ABSTRACT

A device may include an interface and one or more processors. The interface may obtain, from a content source via a network, a playlist file including a plurality of content file identifiers corresponding to a plurality of content files associated with alternate encodings of a content stream. The one or more processors may determine that the alternate encodings correspond to different logical divisions of an image area associated with the content stream, forward, to a client device, the playlist file for selection of one logical division of the different logical divisions, and request, from the content source via the communication interface and responsive to the forwarding, one or more content file, of the plurality of content files, associated with a particular encoding of the alternate encodings.

13 Claims, 7 Drawing Sheets

FIG. 3

```
#EXTM3U
#EXT-X-STREAM-INF:PROGRAM-ID=1,ROI=0:0:100:100,BANDWIDTH=940000
01.m11u94
#EXT-X-STREAM-INF:PROGRAM-ID=1,ROI=100:0:200:100,BANDWIDTH=940000
01.m12u94
#EXT-X-STREAM-INF:PROGRAM-ID=1,ROI=0:100:200:200,BANDWIDTH=940000
02.m21u94
#EXT-X-STREAM-INF:PROGRAM-ID=1,ROI=100:100:200:200,BANDWIDTH=940000
03.m22u94
#EXT-X-STREAM-INF:PROGRAM-ID=1,ROI=0:0:100:100,BANDWIDTH=745984
01.m11u74
#EXT-X-STREAM-INF:PROGRAM-ID=1,ROI=100:0:200:100,BANDWIDTH=745984
01.m12u74
#EXT-X-STREAM-INF:PROGRAM-ID=1,ROI=0:100:200:200,BANDWIDTH=745984
02.m21u74
#EXT-X-STREAM-INF:PROGRAM-ID=1,ROI=100:100:200:200,BANDWIDTH=745984
03.m22u74
#EXT-X-STREAM-INF:PROGRAM-ID=1,ROI=0:0:100:100,BANDWIDTH=1341568
01.m11u13
#EXT-X-STREAM-INF:PROGRAM-ID=1,ROI=100:0:200:100,BANDWIDTH=1341568
01.m12u13
#EXT-X-STREAM-INF:PROGRAM-ID=1,ROI=0:100:200:200,BANDWIDTH=1341568
02.m21u13
#EXT-X-STREAM-INF:PROGRAM-ID=1,ROI=100:100:200:200,BANDWIDTH=1341568
03.m22u13
```

REGION OF INTEREST STREAMING

BACKGROUND

Many entertainment and communication-related electronic ("client") devices are capable of receiving, transmitting, and/or presenting streaming digital data ("content"). For example, a set-top box may be configured to receive multimedia programs, such as video-on-demand (VOD) programs, that are streamed from a content provider. A computer may be configured to receive a stream of a video clip over the Internet. A phone application may enable receipt of streaming audio data over a real-time transport protocol (RTP) link/channel that is established over an Internet protocol (IP) network or a cellular network.

Service providers and/or content providers often offer multiple encodings of a multimedia presentation, for example, to allow a client device to dynamically switch between alternate versions of the multimedia presentation having different bitrates. Typically, however, a subscriber has limited options with respect to selecting different camera angles and/or displaying less than an entire viewing area of the multimedia presentation, for example, a select portion of an overall image area that may be of particular interest to the subscriber.

DETAILED DESCRIPTION

The following detailed description refers to the accompanying drawings. The same reference numbers in different drawings may identify the same or similar elements. As used herein, the term "content" is intended to be broadly interpreted herein to include, for example, audio and/or video content (e.g., a movie, a three-dimensional (3D) movie, show, television program, video stream, audio stream, Internet radio, broadcast of a live event (e.g., sporting event, concert, etc.)).

When a system described herein, such as a customer-premises distribution device, e.g., a content interface device (set-top box (STB), etc.), obtains a playlist/manifest file from a content source (e.g., a server), the system may present a client device/media player with multiple encodings corresponding to variant logical divisions of an image area associated with the content stream, which the client device/media player may dynamically switch between. The encodings may include a format such as, for example, H.264, MPEG-4 Advanced Video coding (AVC), high efficiency advanced audio coding (HE-AAC), etc.

Figure 1:
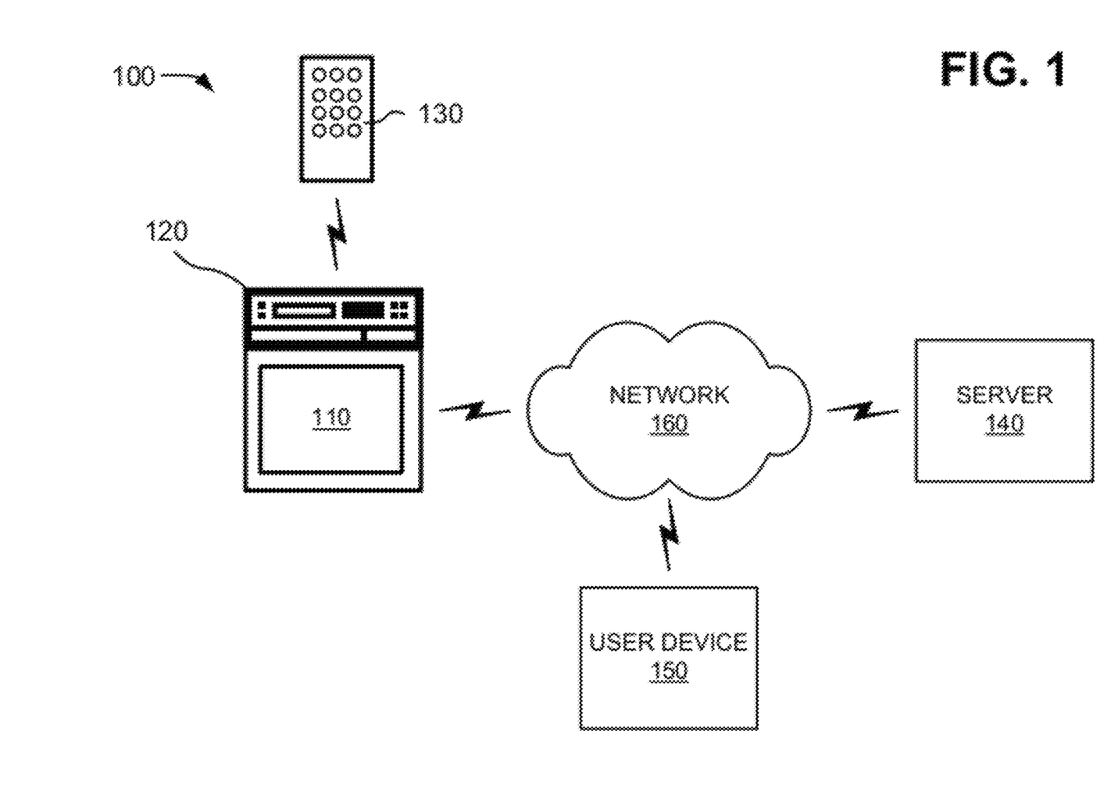
FIG. 1 depicts a diagram of an exemplary environment in which systems and methods described herein may be implemented.

FIG. 1 is a diagram of an exemplary environment 100 in which systems and methods described herein may be implemented. As illustrated, network 100 may include a television (TV) 110, a set top box (STB) 120, a remote control 130, a server 140, and a user device 150, which may connect to a network 160, via wired and/or wireless connections, for example, cable, fiber optic, and/or wireless. The number of devices and networks, and configuration in environment 100 is exemplary and provided for simplicity. In practice, environment 100 may include additional devices, fewer devices, different devices, and/or differently arranged devices, than those illustrated in FIG. 1. Additionally, or alternatively, in practice, environment 100 may include additional networks and/or differently arranged networks, than those illustrated in FIG. 1. Also, one or more functions and/or processes described as being performed by a particular device may be performed by a different device, or some combination of devices, according to other embodiments.

TV 110 may include a device configured to present streaming content provided by STB 120, and/or other content provided by other devices (e.g., a digital video disk (DVD) player, a video camera, a home media player, etc.) connected to TV 110. According to exemplary embodiments, TV 110 may be a television and/or other types of devices, for example, a monitor, a mobile device having a display (e.g., a cell phone or personal digital assistant), a laptop computer, a gaming console, a music device, etc. According to an exemplary embodiment, TV 110 and STB 120 may be separate devices, as illustrated in FIG. 1. According to other embodiments, TV 110 may include STB 120 or include some of the functionalities associated with STB 120. According to still other embodiments, TV 110 may include STB 120, and/or remote control 130.

STB 120 may include a device that communicates with server 140 to provide broadband services and/or streaming content to TV 110 or another device (e.g., user device 150). STB 120 may allow a user to select the content provided to TV 110 based on a signal generated by and received from remote control 130. In one exemplary implementation, features of STB 120 may be incorporated directly within TV 110. According to an exemplary embodiment, STB 120 may include a client, a thin client, a descrambler, a converter box, a receiver, a tuner, an optical termination point (OTP), an optical network terminal (ONT), a server device, a pedestal, or some other type of customer premises equipment. According to an exemplary embodiment, STB 120 may also include a digital video recorder (DVR) and/or a hard drive or other storage device.

Remote control 130 may include a device that communicates with TV 110 and/or STB 120 (and/or other devices associated with TV 110 and/or STB 120) to allow a user to control content provided to TV 110 using, for example, a specified IPTV channel entry, channel up/down scrolling, channel scanning, etc. Remote control 130 may include one or multiple input mechanisms (e.g., buttons, a display, a keypad, a touchpad, a microphone, etc.) to receive user input to, for example, select content for viewing. According to an exemplary embodiment, remote control 130 may correspond to a remote control device, a tablet device, a mobile communication device, or some other type of user device. According to other embodiments, remote control 130 may include TV 110 and/or STB 120 and/or include one or more of the functionalities associated with STB 120.

Server 140 may include one or more server entities, or other types of computation or communication devices, that gather, process, search, and/or provide content in a manner described herein. In one implementation, server 140 may include a server (e.g., a computer system or an application), a cable head-end, or a broadcaster capable of providing media content (e.g., TV programming, movies, on-demand services, over-the-top (OTT) content, live television, news feeds, blog feeds, etc.), advertisements, instructions, codes, encryption keys, and/or other information associated with products and/or services, etc., to STB 120. In some implementations, server 140 may be configured to receive information from STB 120, TV 110, and/or user device 150.

User device 150 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop or notebook computer, a personal computer, an ultra mobile personal computer (UMPC), a netbook, a tablet, or other types of computation or communication devices, threads or processes running on such devices, and/or objects executable by such devices. In one implementation, user device 150 may include any device (e.g., an Internet Protocol (IP)-based device) that is capable of accessing server 140, for example, via network 160. In other implementations, user device 150 may be configured to interact with STB 120 and/or TV 110, via a local network other than network 160 (e.g., a home wired or wireless network—not shown in FIG. 1).

Network 160 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or any combination of networks.

Figure 2:
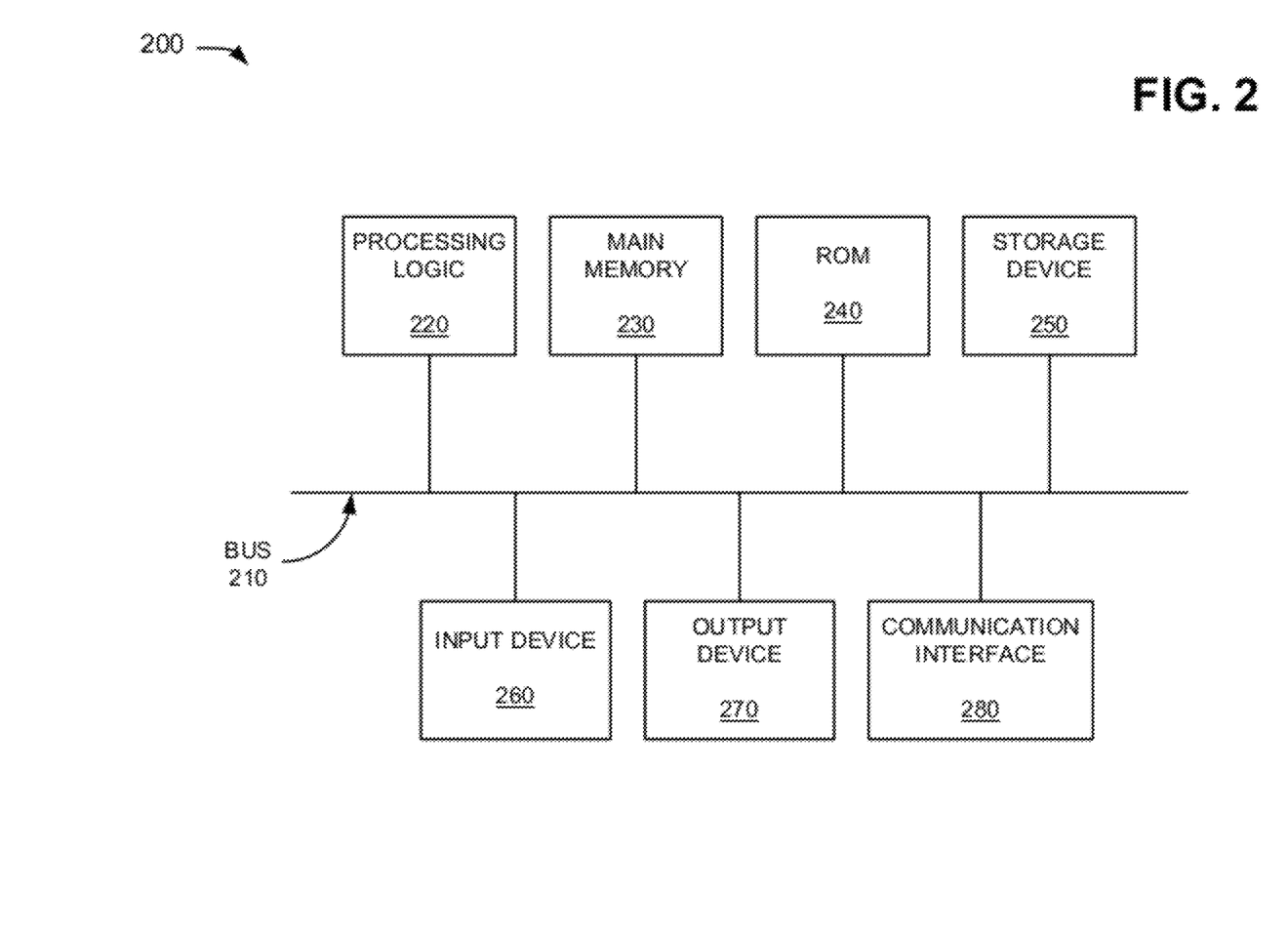
FIG. 2 illustrates exemplary components of one or more devices depicted in FIG. 1.

FIG. 2 is an exemplary diagram of a device 200 that may correspond to any of STB 120, server 140, and/or user device 150. As illustrated, device 200 may include a bus 210, processing logic 220, a main memory 230, a read-only memory (ROM) 240, a storage device 250, an input device 260, an output device 270, and a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control 130, etc. Output device 270 may include a mechanism that outputs information to the operator, including a display, a printer, a speaker, etc. Communication interface 280 may include a transceiver that enables device 200 to communicate with other devices and/or systems. For example, communication interface 280 may include mechanisms for communicating with another device or system via a network, such as network 160.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware devices, circuitry, and/or software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
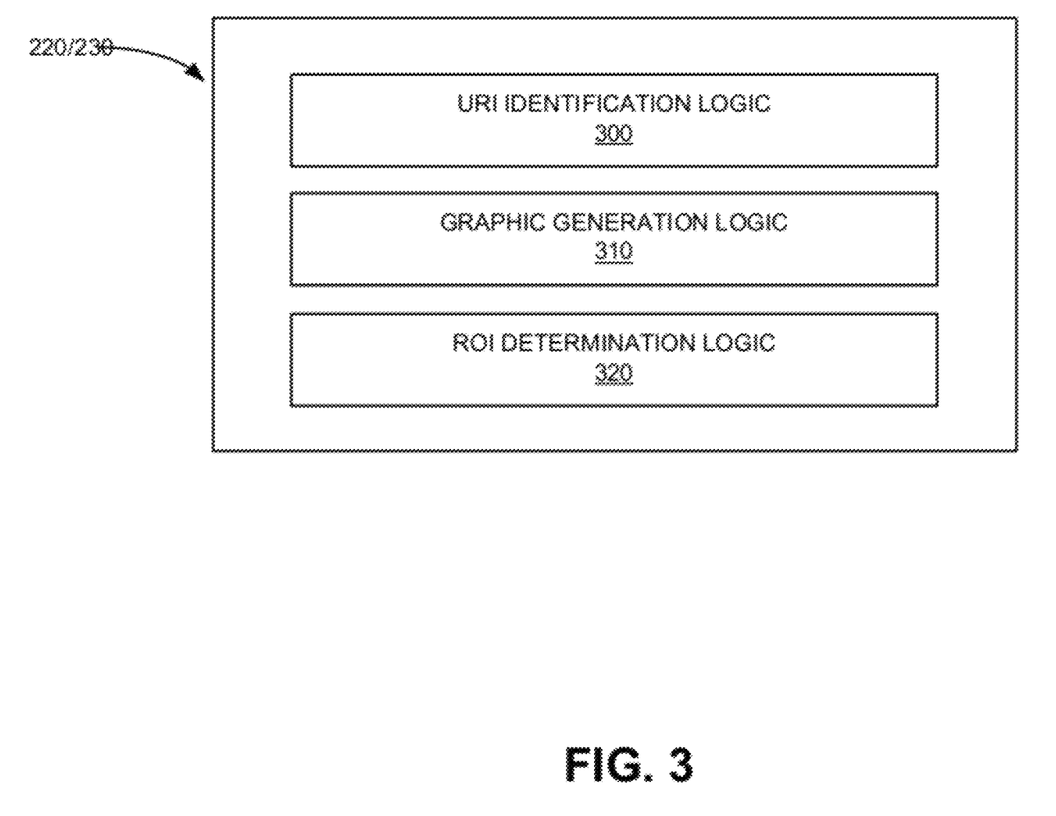
FIG. 3 is an exemplary functional block diagram of components implemented in one or more devices depicted in FIG. 1.

FIG. 3 is an exemplary functional block diagram of components implemented in STB 120, TV 110, and/or user device 150 of FIG. 1. In an exemplary implementation, all or some of the components illustrated in FIG. 3 may be stored in memory 230. For example, referring to FIG. 3, memory 230 may include uniform resource identifier (URI) identification logic 300, graphic generation logic 310, and region of interest (ROI) determination logic 320. In addition, various logic components illustrated in FIG. 3 may be implemented by processing logic 220 executing one or more programs stored in memory 230.

URI identification logic 300 may include logic for determining whether a playlist file, for example, received from a content source (e.g., server 140), includes content file identifiers (e.g., URIs) corresponding to content files associated with alternate encodings of a content stream, in which the alternate encodings correspond to different logical divisions of an image area associated with the content stream. For example, URI identification logic 300 may determine whether tags in the URIs listed in the playlist includes ROI attributes and/or any other attributes that relate to spatial coordinates or other parameters that define alternate viewing portions of the image in the content stream.

Based on information received from URI identification logic 300, graphic generation logic 310 may generate a graphical representation illustrating the alternate logical divisions. For example, graphic generation logic 310 may use the ROI values (e.g., spatial coordinates) and information related to a coordinate system of TV 110, to generate visual "hot spots," indicative of the variant logical divisions, within an overall image in the content stream. Graphic generation logic 310 may present the graphical image with the hot spots to TV 100, for example, with a prompt to a user of TV 100 to select an ROI corresponding to one of the hot spots.

Based on information from TV 110, remote control 130, and/or user device 150 received in response to the presentation of the hot spots, ROI determination logic 320 may determine which content file identifier corresponds to an identified hot spot. In one implementation, in the absence of user input (e.g., after a particular amount of time) in response to the presentation of the graphical image, ROI determination logic 320 may select an ROI attribute value by default. ROI determination logic 320 may select a default ROI based on any number of factors, including historical information regarding previous ROI selections made by a particular user/client device. In any case, ROI determination logic 320 may identify the content stream segment corresponding to the selected ROI, and the corresponding content file can be requested and obtained, for example, via an HTTP live stream or other IP-based streaming protocol from server 140.

Figure 4:
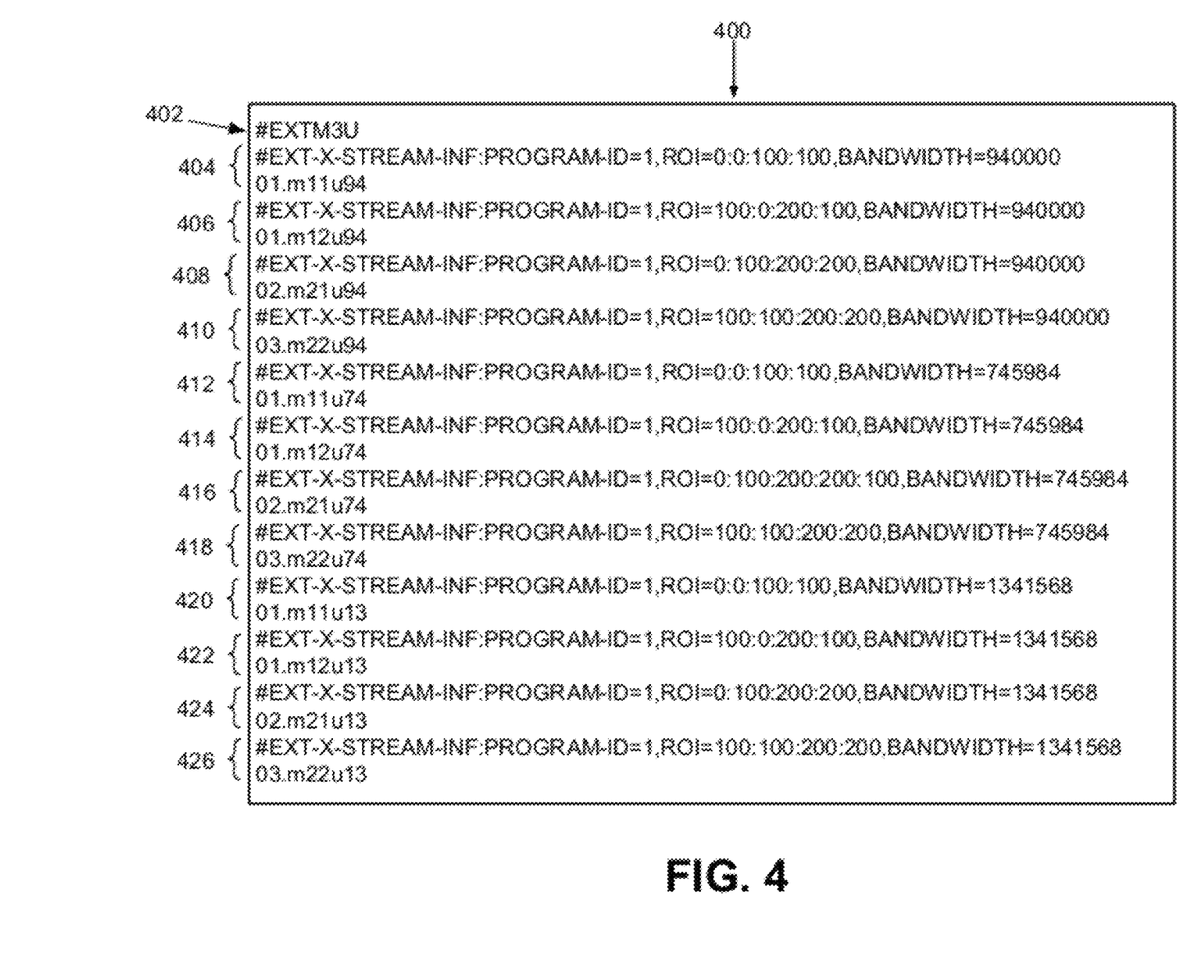
FIG. 4 illustrates an exemplary playlist according to one implementation.

FIG. 4 shows an exemplary index file or a playlist file 400 that lists storage locations (e.g., universal resource locator (URL) or uniform resource identifier (URI), network addresses, etc.) of content file segments in an order that the segments are to be reassembled and/or played at TV 110 and/or user device 150. Examples of index/playlist files may include M3U8 files, M3U files, PLS files, Advanced Stream Redirector (ASX) files, etc. Playlist file 400 is depicted as being in an extended M3U file format, including the comment character "#" preceding the tag "EXTM3U" in the first line 402, and an ordered list of content file segment identifiers indicated by the tags "EXT-X-STREAM-INF" in content segment identifiers 404-426. Other text files/protocols may be used. Playlist file 400 is depicted for simplicity and may include additional tags that may be defined by extended playlist file (e.g., M3U8) protocol. Each of segment identifiers 404-426 may include a character string (e.g., URI) that identifies a location of the content file segment, for example, in server 140. Each of the URIs may include the attributes, "PROGRAM-ID," "ROI," and "BANDWIDTH." Other attributes are possible.

Because playlist file 400 includes variant content stream segments for a single content stream (presentation), each of content segment identifiers 404-426 includes an attribute value of "1" for the PROGRAM-ID attribute. Each of content segment identifiers 404-410 includes common attribute values of "940000" for the BANDWIDTH attribute; each of segment identifiers 412-418 includes common attribute values of "745984" for the BANDWIDTH attribute; and each of content segment identifiers 420-426 includes common attribute values of "1341568" for the BANDWIDTH attribute. The client device/media player may be configured to dynamically switch among the variant bandwidths based on an amount of bandwidth that the client device/media player can support at any given time.

Each of content segment identifiers 404, 412, 420 includes common attribute values of "0:0:100:100" for the ROI attribute; each of content segment identifiers 406, 414, 422 includes common attribute values of "100:0:200:100" for the ROI attribute; each of content segment identifiers 408, 416, 424 includes common attribute values of "0:100:200:200" for the ROI attribute; and each of content segment identifiers 410, 418, 426 includes common attribute values of "100:100:200:200" for the ROI attribute. The above ROI values may include integers corresponding to Cartesian coordinates for pixels in a display. Other parameters may be used.

Figure 5:
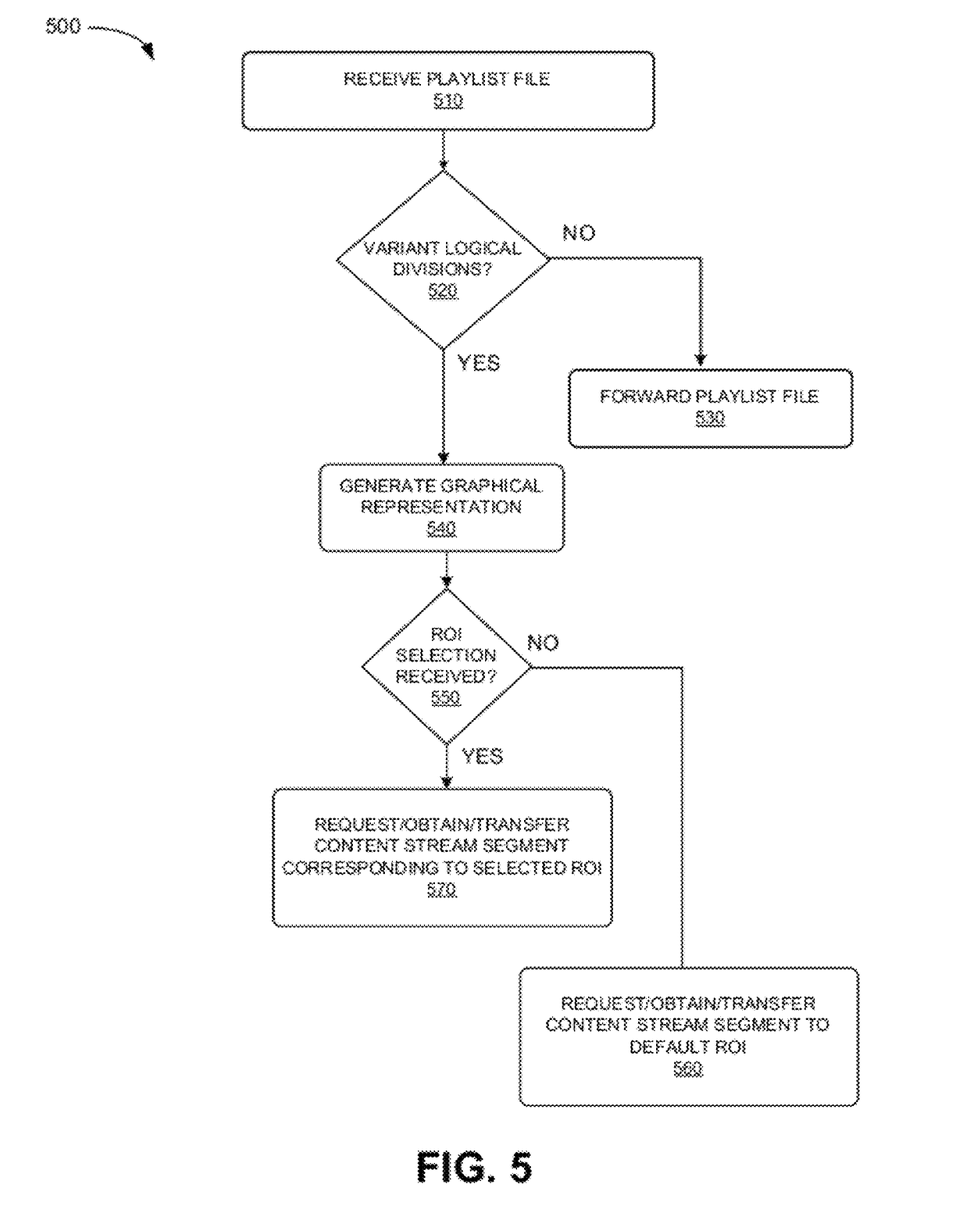
FIG. 5 is a flow chart of exemplary processes according to implementations described herein.

FIG. 5 is a flow diagram illustrating exemplary processing 500 associated with the above-described features of FIGS. 1-4. Processing 500 may begin with STB 120 and/or user device 150 receiving a playlist file, for example, playlist file 400 (block 510). URI identification logic 300 may examine playlist file 400 to determine whether playlist file 400 includes multiple content file identifiers for a single content stream corresponding to content file segments having variant logical divisions of the content stream (block 520). When URI identification logic 300 determines that variant encodings are not listed with respect to variant logical divisions, the playlist file may be forwarded, for example, via output device 270 and/or communication interface 280 to TV 110 and/or user device 150 for selection of a particular content segment (NO—block 530).

Figure 6:
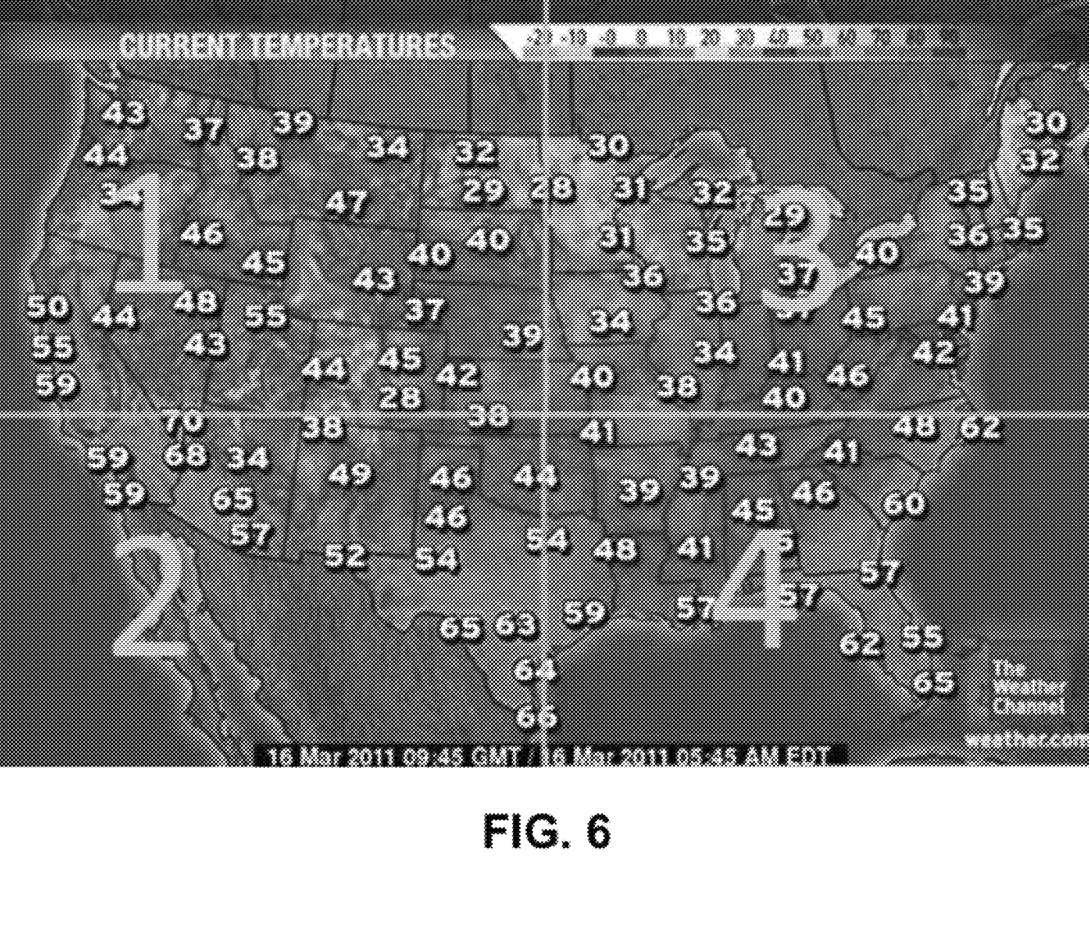
FIG. 6 illustrates an exemplary graphical representation of the logical divisions identified in the playlist of FIG. 4, in which the image is presented having visual information superimposed thereon.

In one implementation, when URI identification logic 300 determines that variant encodings are listed with respect to variant logical divisions, as in playlist file 400, graphic generation logic 310 may generate a graphical representation depicting the logical divisions corresponding to the ROI values (YES—block 540). The graphical representation may be provided, for example, via output device 270 and/or communication interface 280 to TV 110 and/or user device 150 for selection, by a user, of a particular ROI. FIG. 6 illustrates an exemplary graphical representation of the logical divisions identified in playlist 400, in which the image is presented with visual information superimposed on an image. That is, graphic generation logic 310 may superimpose lines indicating the perimeters of the various logical divisions, as well as numbers corresponding to, as shown here, "hotspot quadrants" 1, 2, 3, and 4 corresponding to content segment identifiers 404, 412, 420; content segment identifiers 406, 414, 422; content segment identifiers 408, 416, 424; and content segment identifiers 410, 418, 426, respectively. Other visual information may be used. It should be appreciated that any number of logical divisions may be presented of equal and/or unequal size; regularly- and/or irregularly-shaped; similar and/or dissimilar in shape; distinct and/or overlapping in area; comprise only a portion and/or an entirety of the image in toto, etc.

Returning to FIG. 5, ROI determination logic 320 may determine whether a selection of an ROI is received, for example, from TV 110, remote control 130, and/or user device 150 via input device 260 and/or communication interface 280, for example, within a particular amount of time for responding to a prompt provided with the graphical representation (block 550). When no response is detected, ROI determination logic 320 may select a default URI (NO—block 560), or simply provide the entire image segment. When a response is detected, for example, a user may input a particular number displayed over a particular region of interest, for example, using a keypad on remote control 130, or by scrolling over the hotspots with an arrow key and pressing enter over the desired hotspot, ROI determination logic 320 may request the corresponding content stream segment from server 140, for example, via network 160 (block 570).

Figure 7:
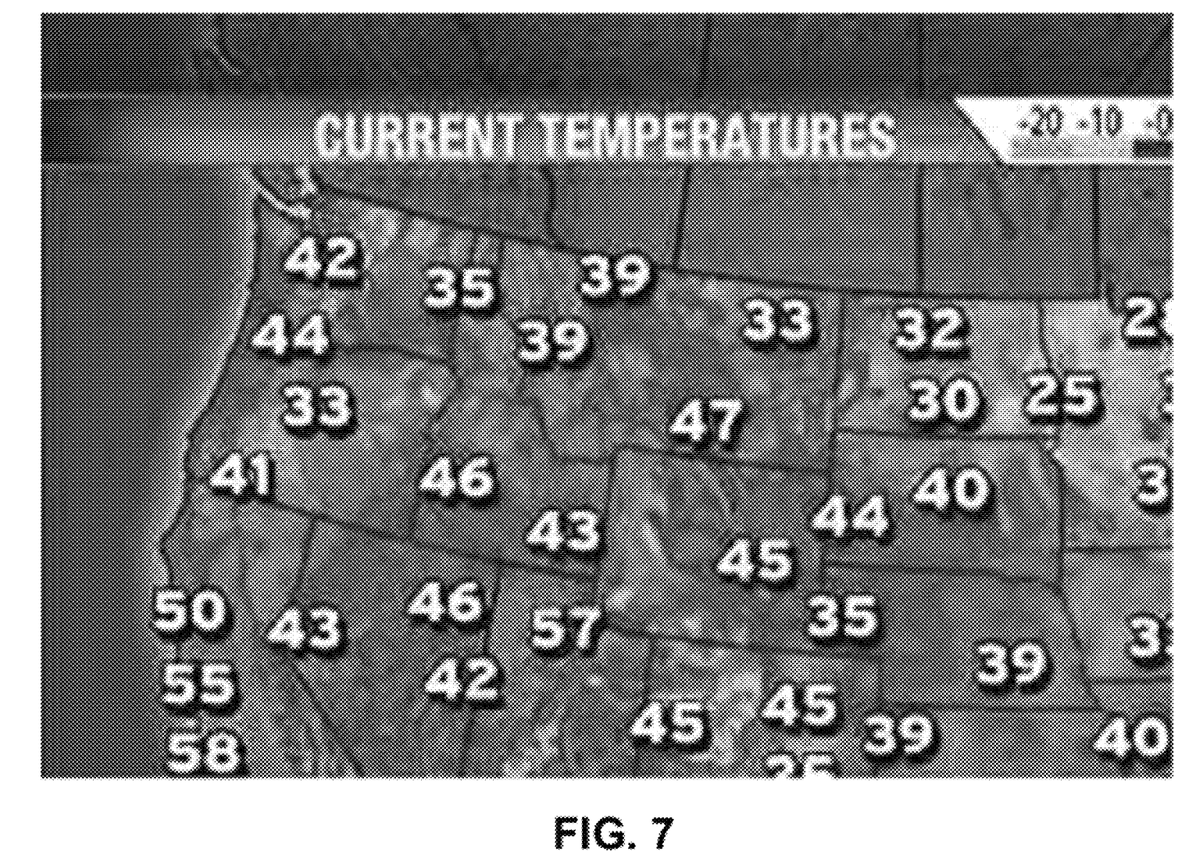
FIG. 7 illustrates a display screen in which a content stream segment for a particular ROI of FIG. 6 has been obtained and transferred to a client device/media player.

Assume that the user input hotspot (here, quadrant) no. 1 as the selected ROI. FIG. 7 shows a display screen in which the content stream segment corresponding to content stream identifiers 404, 412, or 420 has been obtained and transferred to TV 110 and/or user device 150, and the image content relating to the rest of the image (i.e., quadrants 2-4) is not obtained by STB 120 and/or user device 150 and/or transferred to TV 110 and/or user device 150. Subsequent content stream segments obtained by STB 120 and/or user device 150 and/or transferred to TV 110 and/or user device 150 may consistent with the particular ROI selected, or switched upon receiving an updated selection from STB 120 and/or user device 150.

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks have been described with regard to an exemplary process illustrated in FIG. 5, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   obtaining, from a content source via a network, a playlist file including a plurality of content file identifiers corresponding to storage locations of a plurality of content files associated with alternate encodings of a content stream, wherein each of the content file identifiers contains a unique set of attribute values for attributes that differentiate each of the alternate encodings;
   determining that an attribute value for a stream identification attribute is the same for each of the content file identifiers, indicating that the alternate encodings correspond to a single content stream;
   determining that an attribute value for a spatial coordinates attribute is not the same for each of the content file identifiers, indicating that the alternate encodings correspond to different logical divisions of an image area associated with the spatial coordinates for the content stream;
   forwarding, to a client device, the playlist file for selection of one logical division of the different logical divisions;
   receiving, from the client device or a device associated with the client device, a request for a graphic representation of the different logical divisions of the image area;
   presenting, to the client device and responsive to the request, a graphical representation of each of the different logical divisions of the image area, wherein the graphical representations complementarily form an entirety of the image area; and
   obtaining, from the content source via the network and responsive to the forwarding, one or more content file, of the plurality of content files, associated with a particular encoding of the alternate encodings based on user input received with respect to the graphical representations.

2. The method of claim 1, further comprising:
   transferring, with the one or more content file, the spatial coordinates, of a particular logical division associated with the particular encoding, to be mapped to a coordinate system of a display of the client device.

3. The method of claim 1, wherein at least two of the plurality of content file identifiers further comprise:
   a different attribute value for a bitrate associated with the corresponding content files.

4. The method of claim 1, wherein, when no response is received responsive to the forwarding, obtaining the one or more content file comprises selecting the one or more content file by default.

5. The method of claim 1, wherein at least two of the different logical divisions share overlapping areas of the image area.

6. A network device comprising:
   one or more processors configured to:
      provide an extended text file, including a plurality of segment identifiers corresponding to alternate encodings of a plurality of content stream segments, with a unique set of attribute values for attributes that differentiate each of the content stream segments, including:
         an attribute value for a stream identification attribute that is the same for each of the segment identifiers, indicating that the content stream segments correspond to a single content stream, and
         an attribute value for a spatial coordinates attribute that is not the same for each of the segment identifiers, indicating that different logical divisions of an image area associated with the plurality of content stream segments, and
      generate, responsive to a first request received from a user device, a graphical representation of each of the different logical divisions of the image area, wherein together the graphical representations form a full complement of the image area; and
   an interface configured to:
      send, via a network, the extended text file and the full complement of the image area to the user device, and
      receive, from the user device via the network, a second request for one or more content stream segment associated with a particular encoding, of the alternate encodings, corresponding to a particular graphical representation corresponding to a particular logical division of the image area associated with the one or more content stream segment.

7. The network device of claim 6, wherein the interface is further configured to transfer, responsive to the second request, the one or more content stream segment to the user device via the network.

8. The network device of claim 6, wherein at least two of the different logical divisions share overlapping areas of the image area.

9. A device comprising:
   an interface configured to obtain, from a content source via a network, a playlist file including a plurality of content file identifiers corresponding to storage locations of a plurality of content files associated with alternate encodings of a content stream, wherein each of the content file identifiers contains a unique set of attribute values for attributes that differentiate each of the alternate encodings; and
   one or more processors configured to:
      determine that an attribute value for a stream identification attribute is the same for each of the content file identifiers, indicating that the alternate encodings correspond to a single content stream,
      determine that an attribute value for a spatial coordinates attribute is not the same for each of the content file identifiers, indicating that the alternate encodings correspond to different logical divisions of an image area associated with the spatial coordinates for the content stream,
      generate, responsive to a request received from a client device, a graphical representation of each of the different logical divisions of the image area, wherein the graphical representations complementarily form the image area, forward, to a client device, the playlist file and the graphical representations for selection of one graphical representation corresponding to one logical division of the different logical divisions, and request, from the content source via the communication interface and responsive to the forwarding, one or more content file, of the plurality of content files, associated with a particular encoding of the alternate encodings.

10. The device of claim 9, wherein the one or more processors are further configured to:

obtain, from the content source via the network, the one or more content file, and transfer to the client device, the one or more content file and the spatial coordinates, of a particular logical division associated with the particular encoding, to be mapped to a coordinate system of a display of the client device.

11. The device of claim 9, wherein at least two of the plurality of content file identifiers further comprise:

a different attribute value for a bitrate associated with the corresponding content files.

12. The device of claim 9, wherein, when no response is received responsive to the forwarding, the one or more processors are further configured to select the one or more content file by default.

13. The device of claim 9, wherein at least two of the different logical divisions share overlapping areas of the image area.

* * * * *